(12) United States Patent
Burton et al.

(10) Patent No.: US 6,397,358 B1
(45) Date of Patent: May 28, 2002

(54) METHOD OF IDENTIFYING A FRAME FOR ERASURE IN A DIGITAL DATA TRANSMISSION SYSTEM

(75) Inventors: Mark Burton; Stephen Truelove, both of Berkshire (GB)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/322,812

(22) Filed: May 28, 1999

(30) Foreign Application Priority Data

May 29, 1998 (GB) ............................................. 9811419

(51) Int. Cl.⁷ ............................................. G06R 11/00
(52) U.S. Cl. ....................................................... 714/705
(58) Field of Search ............................... 714/752–755, 714/705, 810; 375/225

(56) References Cited

U.S. PATENT DOCUMENTS

| | | | |
|---|---|---|---|
| 5,557,639 A | 9/1996 | Heikkila et al. | ............ 375/224 |
| 5,596,678 A | 1/1997 | Wigren et al. | ............ 704/228 |
| 5,598,506 A | 1/1997 | Wigren et al. | ............ 704/233 |
| 5,666,370 A | * 9/1997 | Ganesan et al. | ............ 714/752 |
| 6,092,230 A | * 7/2000 | Wood et al. | ............ 714/755 |

FOREIGN PATENT DOCUMENTS

GB 2312359 A 10/1997

OTHER PUBLICATIONS

Wigard et al., BER and FER perdiction of control and traffic channels for GSM type of Air interface, IEEE, pg 1588–1592, May 21, 1998.*
Eryurtlu et al., Error robusthness improvement of video codes with two-way decodable codes, IEEE, p. 41–43, Jan. 2, 1997.*
Wigard et al., A simple mapping from C/I to FER and BER for GSM of Air interface, IEEE, p. 78–82, 1996.*
Black et al., Hybrid survivor path architechtures for Viterbi decoders, IEEE, p. I–433–I–436, 1993.*
Abstract of International Patent Application WO 97/27686 A1, dated Jul. 31, 1997.
Abstract of International Patent Application WO 94/17472, dated Aug. 4, 1994.
"Mobile Radio Communications", published by John Wiley & Sons, Raymond Steele (Ed.), pp. 601–612 and 677–683.
Belzile, J., et al., "Bidirectional Breadth–First Algorithms for the Decoding of Convolutional Codes", IEEE Transactions on Communications, vol. 41, No. 2, Feb. 1993, pp. 370–380.
Li, K., et al., "Bidirectional Sequential Decoding For Convolutional Codes", IEEE Pacific Rim Conference on Communications, Computers and Signal Processing, May 9–10, 1991, pp. 200–204.

* cited by examiner

Primary Examiner—Albert DeCady
Assistant Examiner—Shelly A Chase
(74) Attorney, Agent, or Firm—Scully, Scott, Murphy & Presser

(57) ABSTRACT

A method of improving frame erasure performance for slow frequency hopping channels utilizing two convolutional decoding steps and two PBER thresholds in conjunction with the cyclic redundancy check. The breakdown condition in the convolutional decoding process is detected by means of a 'forward backward decoding' algorithm. The breakdown condition is detected with two passes of the convolutional decoder. When the decoder breaks down an essentially random burst of erroneous decoded bits are produced, and due to the memory effect of the decoder these will be different in each decoding direction. These erroneous random errors may be detected by comparison of the two decoded sets of data.

3 Claims, 1 Drawing Sheet

METHOD OF IDENTIFYING A FRAME FOR ERASURE IN A DIGITAL DATA TRANSMISSION SYSTEM

BACKGROUND OF THE INVENTION

1. Field of the Invention

This invention relates to digital data transmission, and in particular it relates to digital data decoders. The following description is based on the GSM cellular communications system for which the invention is of particular utility. It will be apparent to those skilled in the art, however that the invention may be applied to other systems of digital data transmission.

2. Description of the Related Art

Reference is made to U.S. Pat. Nos. 5,598,506 and 5,596,678 to Wigren et al U.S. Pat. No. 5,557,639 to Heikkila and "Mobile Radio Communications" published by John Wiley & Sons, Raymond Steele (Ed.) for a description of the prior art and technological background. The following abbreviations are used herein:

GSM—Global System for Mobile communications, (formerly Groupie Special Mobile)
BCCH—Broadcast control channel
TCH/F—Traffic channel full rate
CRC—Cyclic redundancy check.
BFI—Bad frame indication
MS—Mobile station
PBER—Pseudo bit error rate The GSM cellular communications system uses the Full Rate speech codec as default. The full rate speech codec encodes 13 kHz samples into 260 bits containing 76 parameters. These 260 bits are divided into two groups based on their subjective importance to speech quality.

The 78 least important bits are known as class II bits and are unprotected. Corruption of these class II bits has little audible effect on speech quality. The most important 182 bits are known as class I bits protected by a half rate convolutional code. The class I bits are further subdivided into Ia and Ib, such that the most significant 50 bits (Ia) are additionally protected by a 3 bit cyclic redundancy check (CRC).

In order to prevent unpleasant audio artifacts during speech transmission, any frame erasure mechanism must detect all frames with class la errors and frames with more than a certain number of class lb errors, as precisely and efficiently as possible for all propagation channel types.

Network operators wish to maximize the capacity and quality of their networks. One of the ways in which this can be achieved is to employ slow frequency hopping. A slow frequency hopping channel follows a cyclic pseudo-random hopping sequence, each burst being transmitted on a frequency which is different from the frequency of the previous burst. A performance gain is achieved from the frequency diversity of the hopping sequence.

The use of slow frequency hopping also allows greater re-use of the frequencies allocated to an network operator, thereby increasing the capacity available. One side effect of slow hopping and frequency re-use is the creation of a special class of propagation channels, known as Telstra channels, so called because the Australian network operator Telstra implemented its own mobile station (MS) performance test for this type of channel.

This class of propagation channel (Telstra) is characterized by a slow frequency hopping channel, hopping across n (typically n=4) frequencies, one of which has a high level of co-channel interference present (typically −10 to −20 dB) which may arise from an adjacent cell's BCCH broadcast or traffic channels. The effect of this interference is that for the burst affected by it, the probability of the bits being in error tends toward 50% (i.e. essentially random) and the other n−1 frequencies have a low probability of error.

Because of the interleaving and re-ordering of the TCH/FS channel, these erroneous bits are evenly distributed across the whole speech frame, interlaced with the correct bits from the other bursts. This is in direct contrast to ordinary (non-Telstra like) channels where all bursts contributing to the speech frame are equally likely to contain errors so that after the interleaving has been removed and re-ordering performed, it is likely that non-evenly distributed bits in the encoded speech frame will be in error. The r=½, K=5 code used in this GSM coding scheme is powerful enough successfully to correct errors on a Telstra channel. This behavior was originally noted by Telstra for a 1:4 hopping channel.

The conventional frame erasure algorithm used for the GSM TCH/FS channel is composed of two individual tests: a 3 bit CRC check and a pseudo bit error rate (PBER) threshold. The PBER is calculated by re-encoding the decoded class I bits and comparing them, bit by bit, with the original received bits. The CRC check is computed over the class la bits of the speech frame. The number of estimated errors is calculated for all of the encoded class I bits.

The frame erasure algorithm proceeds as follows:

1. Convolutionally decode the 189 encoded class I symbols to give the 182 class I bits +3 CRC check bits +4 tail bits.
2. Perform a CRC check on the class Ia bit. If the CRC check fails, mark the frame for erasure.
3. Re-encode the 182 class I bits +3 CRC check bits +4 tail bits and then perform a bit by bit comparison between the re-encoded symbols and the original received symbols, to compute the number of differences.
4. If the number of differences exceeds the PBER threshold then the frame is marked for erasure.

This algorithm works well for "non-Telstra like" channels. However, the performance of the CRC check is dependent on the PBER threshold value. The lower the PBER threshold, the more reliable the CRC check becomes. A PBER threshold value typically of between 45–60 (bit/frame) is required.

This algorithm does not work well for "Telstra like" channels because they require a PBER threshold which is too high for the CRC check to be reliable for use with non-Telstra channels. This is because the convolutional code can correct a larger number of errors for a Telstra channel due to the even, periodic distribution of errors and if the PBER threshold is set too low for "Telstra like" channels, too many error free speech frames will be erased.

SUMMARY OF THE INVENTION

Objects of the present invention includes better frame erasure performance for Telstra 1:3 and 1:4 channels and better error checking of class Ib bits for all channels.

According to the invention there is provided a method of identifying a frame for erasure in a digital data transmission system comprising, after de-interleaving and equalization, the setting of a PBER threshold in accordance with the result of a comparison of the convolutionally decoded received symbols with a copy of the convolutionally decoded received symbols, said copy having been bit reversed, convolutionally decoded and further bit reversed, and comparison of the received symbols with the re-encoded convolutionally decoded received symbols to provide an estimated number of errors in the received symbols and where said estimated number of errors exceeds the PBER threshold setting, the received frame being marked for erasure.

The above and other objects, features and advantages of the present invention will become apparent from the following description with reference to the accompanying drawings which illustrate examples of the present invention.

DETAILED DESCRIPTION OF THE PREFERRED EMBODIMENTS

Figure 1:
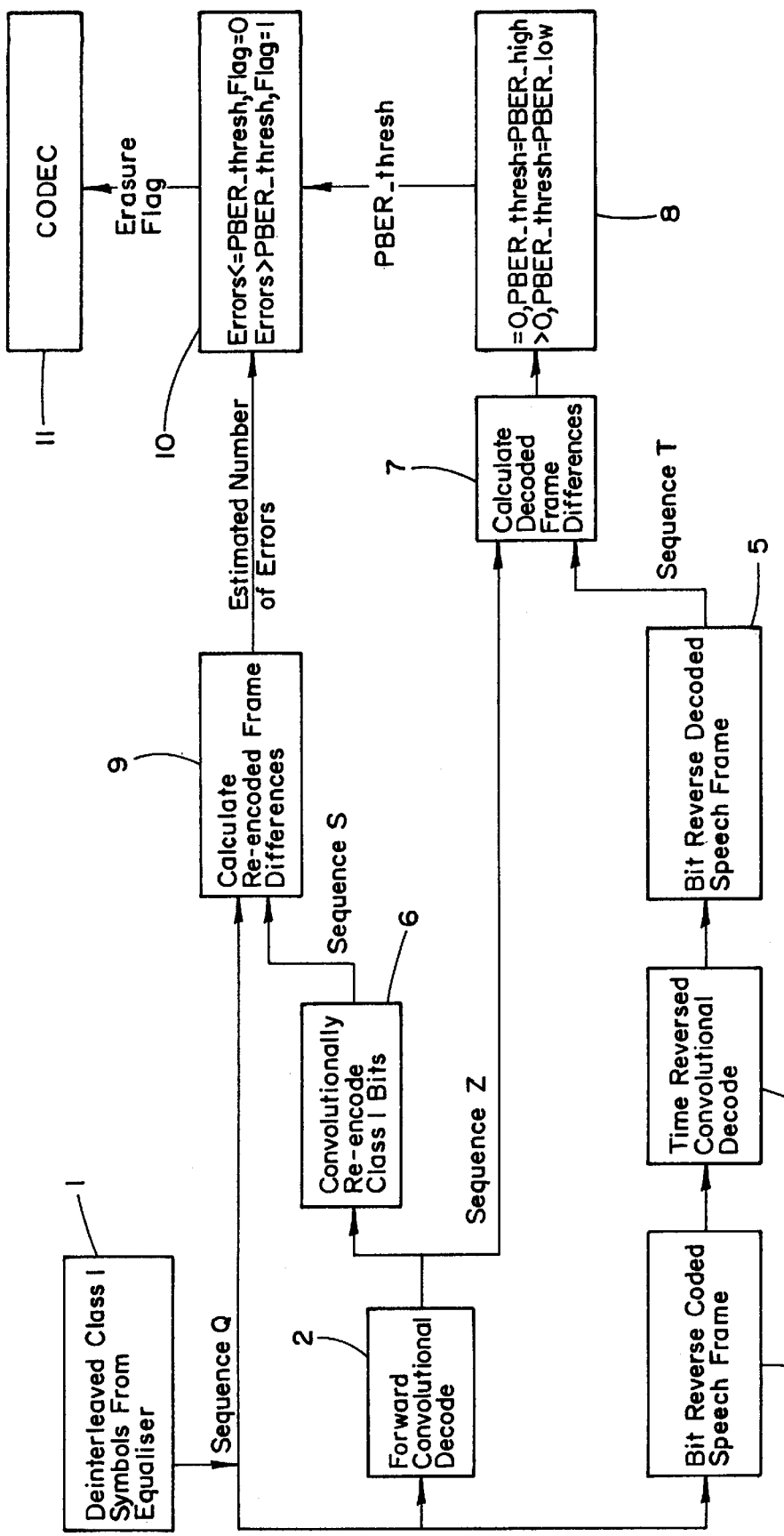
FIG. 1 is a block diagram showing a forward backward decoding mechanism in the digital data transmission system according to an embodiment of the present invention.

One example of the invention will now be described with reference to the sole FIG. 1 which shows the forward backward decoding mechanism. An algorithm, known as the Forward Backward Decoding (FBD) algorithm utilizes two convolutional decoding steps, and two PBER thresholds, to be used in conjunction with the class Ia CRC check. The FBD algorithm is designed to detect the breakdown condition in the convolutional decoding process. This breakdown condition is where decoding fails and an almost random burst of errors is produced from the decoding process until decoding re-synchronizes.

In this example a TCH/FS GSM channel is described, however more generally a method of identifying in a digital data transmission system a frame for erasure is presented comprising, after de-interleaving and equalization, convolutional decoding of the n (n=189) class I encoded symbols, using a trace back length of x less than or equal to n symbols, to produce n decoded class I bits (forward decoded bits), decoding a copy of the n class I encoded symbols in time reversed direction, using a trace back length y, where y is less than or equal to n symbols, to produce n class I time reversed decoded bits, time reverse again the n class I time reversed bits, deleting the bit offset R caused by the reverse decoding process (backward decoded bits), comparing the first n-R bits of the forward decoded bits with the first n-R bits of the backward decoded bits and computing the number of differences, setting the PBER threshold to a high value when no differences are found and setting the PBER threshold to a low value when differences are found, re-encoding the n class I bits to produce n re-encoded symbols, comparing the n re-encoded symbols bit by bit with the received encoded symbols, computing the PBER and if the PBER is greater than the selected PBER threshold value, marking the frame for erasure.

The FBD mechanism is implemented after the usual equalization and de-interleaving stages of a GSM radio receiver as follows: convolutional decoding of the 189 class I encoded symbols (sequence Q), using a trace back length of x (less than 190, typically 31), to produce 189 decoded class I bits (sequence Z), copying the 189 encoded class I symbols and decoding the copy in the time reversed direction, using a trace back length of y symbols (y less than 190, typically 15), to produce 189 class I time reversed decoded bits, the time-reversed set of bits being again time reversed, thereby reverting to the original time ordering (sequence T) and deleting the first 4 bits of (sequence T), comparing sequence Z with sequence T, bit by bit for the first 185 bits and computing the number of differences and where no differences are found between sequence Z and sequence T setting the PBER threshold to a high value, else setting the PBER threshold to a low value, re-encoding sequence Z to provide sequence S and comparing sequence S with the originally received encoded symbols (sequence Q), computing the PBER and where the PBER exceeds the selected PBER threshold value, marking the frame for erasure.

The operation of the FBD algorithm may be seen more clearly with reference to FIG. 1. The output from 1 in FIG. 1 is the sequence of encoded symbols derived from a received frame after de-interleaving and equalization. This sequence of 189 symbols we shall call, for convenience sequence Q. The 189 symbols of sequence Q convolutional decoder 2 and the output from 2 is 189 decoded class I bits, (sequence Z). A copy of sequence Q is bit reversed in 3, convolutionally decoded in 4 and again bit reversed in 5.

Time reversed decoding of any linear convolutional code, where the start and finish states are known, may be achieved by reversing the order of generator polynomials and also reversing the order in which the bits contribute to the produced symbol. As an example consider the n=2, K=5 coding used by a GSM TCH/FS channel. The characteristic polynomials are defined as:

$G_0 = 1 + D^3 + D^4$ (binary representation 1 0 0 1 1)
$G_1 = 1 + D + D^3 + D^4$ (binary representation 1 1 0 1 1)
The time reversed version is then given by:
$T_0 = 1 + D + D^3 + D^4$ (binary representation 1 1 0 1 1)
$T_1 = 1 + D + D^4$ (binary representation 1 1 0 0 1)

Using the modified code decoding may then be performed in the reverse direction, however, allowance must be made for a (K−1) bit alignment error which is incurred.

Account must then be taken of the four bit offset introduced into the time reversed bits due to the reverse decoding by deleting the first four of the decoded bits output from 5, the backward decode, thereby producing sequence T. The first 185 bits of sequence Z are compared bit by bit in 7 with the first 185 bits of sequence T and the PBER computed. If no differences are found between the forward (sequence Z) and backward (sequence T) decodes then the PBER threshold 8 is set to a high value (PBER_high), typically 80–90 (bit/frame ). If one or more differences are detected in the comparison of sequence Z and sequence T then the PBER threshold 8 is set to a low value (PBER_low), typically 40–50 (bit/frame ).

Having set the PBER threshold appropriately, the PBER of the 189 encoded symbols, sequence Q, is estimated by re-encoding in 6 the 189 class I bits of sequence Z to produce 189 re-encoded symbols (sequence S). The 189 re-encoded symbols of sequence S are compared bit by bit in 9 with the originally received encoded symbols, sequence Q and the PBER computed. The PBER is checked in 10 against the PBER threshold set in 8 and if the PBER exceeds the PBER threshold the frame is marked for erasure.

The values of x, y, PBER_ high and PBER_low may be chosen empirically such that best performance of the algorithm is achieved for the desired channel propagation conditions. The purpose of the algorithm is to remove the dependency on a single PBER threshold which is a compromise between Telstra and non-Telstra channels. This purpose is achieved by detecting the breakdown of the convolutional decoder.

This breakdown is detected with the two passes of the convolutional decoder because when the decoder breaks down the essentially random burst of erroneous decoded bits are dependent on the symbols immediately before the breakdown occurs because of the memory effect of the decoder (for a K=5 code the memory length is 4 symbols). Since these symbols will be different for each direction of decoding, differences in these random bits will be seen when the two decoded sets of bits are compared. When no differences are found it is highly likely that decoding has been successful, and thus the PBER_high value of the PBER threshold can be used because the CRC check will be reliable. However, when differences are found the PBER_ low value is selected and this should be low enough to ensure that the CRC check is reliable.

While a preferred embodiment of the present invention has been described using specific terms, such description is for illustrative purposes only, and it is to be understood that changes and variations may be made without departing from the spirit or scope of the following claims.

What is claimed is:

1. A method of identifying a frame for erasure in a digital data transmission system comprising the steps of:

after de-interleaving and equalization, the setting of a PBER threshold in accordance with the result of a comparison of the convolutionally decoded received symbols with a copy of the convolutionally decoded received symbols, said copy having been bit reversed, convolutionally decoded and further bit reversed; and comparing of the received symbols with the re-encoded convolutionally decoded received symbols to calculate the PBER of the received symbols and where said PBER exceeds the PBER threshold setting, the received frame being marked for erasure.

2. A method of identifying a frame for erasure in a digital data transmission system comprising the steps of:

after de-interleaving and equalization, convolutional decoding of the n class I encoded symbols, using a trace back length of x less than or equal to n symbols to produce n decoded class I forward decoded bits;

decoding a copy of the n class I encoded symbols in time reversed direction, using a trace back length y, where y is less than or equal to n symbols, to produce n class I time reversed decoded bits;

time reversing again the n class I time reversed bits;

deleting the bit offset R caused by the reverse decoding process to produce backward decoded bits;

comparing the first n–R bits of the forward decoded bits with the first n–R bits of the backward decoded bits;

computing the number of differences, setting the PBER threshold to a high value when no differences are found and setting the PBER threshold to a low value when differences are found;

re-encoding the n class I bits to produce n re-encoded symbols;

comparing the n re-encoded symbols bit by bit with the received encoded symbols; and computing the PBER and if the PBER is greater than the selected PBER threshold value marking the frame for erasure.

3. A method of identifying a frame for erasure in a TCH/FS GSM channel comprising the steps of:

convolutional decoding of the 189 class I encoded symbols sequence Q, using a trace back length of x symbols, to produce 189 decoded class I bits sequence Z;

copying the 189 encoded class I symbols and decoding the copy in the time reversed direction, using a trace back length of y, to produce 189 class I time reversed decoded bits;

time reversing again the time-reversed set of bits to generate sequence T, thereby reverting to the original time ordering and deleting the first 4 bits of sequence T;

comparing sequence Z with sequence T, bit by bit, for the first 185 bits and computing the number of differences and where no differences are found between sequence Z and sequence T setting the PBER threshold to a high value, else setting the PBER threshold to a low value, re-encoding sequence Z to provide sequence S;

comparing sequence S with the originally received encoded symbols sequence Q; and computing the PBER and where the PBER exceeds the selected PBER threshold value, marking the frame for erasure.

* * * * *